United States Patent
Richter

(10) Patent No.: US 9,850,338 B2
(45) Date of Patent: Dec. 26, 2017

(54) PROCESS FOR ISOCYANATE MODIFICATION USING SPIROCYCLIC AMMONIUM SALTS AS CATALYST

(71) Applicant: Covestro Deutschland AG, Leverkusen (DE)

(72) Inventor: Frank Richter, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/119,177

(22) PCT Filed: Feb. 13, 2015

(86) PCT No.: PCT/EP2015/053087
§ 371 (c)(1),
(2) Date: Aug. 16, 2016

(87) PCT Pub. No.: WO2015/124504
PCT Pub. Date: Aug. 27, 2015

(65) Prior Publication Data
US 2017/0008995 A1    Jan. 12, 2017

(30) Foreign Application Priority Data
Feb. 18, 2014 (EP) .................... 14155525

(51) Int. Cl.
*C08G 18/02* (2006.01)
*C08G 18/20* (2006.01)

(52) U.S. Cl.
CPC .......... *C08G 18/022* (2013.01); *C08G 18/02* (2013.01); *C08G 18/027* (2013.01); *C08G 18/2081* (2013.01); *C08G 2105/02* (2013.01)

(58) Field of Classification Search
CPC .... C08G 18/02; C08G 18/022; C08G 18/027; C08G 2105/802
See application file for complete search history.

(56) References Cited

U.S. PATENT DOCUMENTS

| 4,960,848 A | 10/1990 | Scholl et al. |
| 5,013,838 A | 5/1991 | Scholl |
| 5,914,383 A | 6/1999 | Richter et al. |
| 6,090,939 A | 7/2000 | Richter et al. |
| 6,107,484 A | 8/2000 | Richter et al. |
| 2007/0049750 A1 | 3/2007 | Siggel et al. |
| 2015/0025268 A1 | 1/2015 | Richter et al. |

FOREIGN PATENT DOCUMENTS

| CA | 2244486 A1 | 2/1999 |
| EP | 0235388 A2 | 9/1987 |
| EP | 0295926 A2 | 12/1988 |
| EP | 0315692 A1 | 5/1989 |
| EP | 0447074 A2 | 9/1991 |
| EP | 0896009 A1 | 2/1999 |

OTHER PUBLICATIONS

Laas, et al., Synthesis of Aliphatic Polyisocyanates Containing Buiret, Isocyanurate or Uretdione Backbones for Use in Coatings, Journal for Practical Chemistry, vol. 336, No. 3, pp. 185-200 (1994).*
The Synthesis of Aliphatic Polyisocyanates Containing Biuret, Isocyanurate or Uretdione Backbones for use in Coatings, Laas, et al., J. Prakt Chem., 1994, 336, 185-200.
1,4,2-Diazaphospholidine-3,5-diones and Related Compounds: A Lecture on Unpredictability in Catalysis, Frank U. Richter, Chem. Eur. J. 2009, 15, pp. 5200-5202.
D. Wendisch, H. Reiff and D. Dieterich, Die Angewandte Makromolekulare Chemie 141, 1986, 173-183 (Nr. 2302).

* cited by examiner

*Primary Examiner* — Erich A Leeser
(74) *Attorney, Agent, or Firm* — John E. Mrozinski, Jr.

(57) ABSTRACT

The Invention relates to a process for modifying isocyanates, in which at least one monomeric organic isocyanate having an NCO functionality>1 is oligomerized in the presence of at least one spirocyclic ammonium salt having a cation of the formula I as catalysts for the isocyanate modification, where substituents X and Y in the N positions are identical or different, substituted or unsubstituted C2-C20-alkylene chains optionally interrupted by heteroatoms (O, N, S) and by aromatic rings. The invention further relates to the use of such a catalyst.

18 Claims, No Drawings

PROCESS FOR ISOCYANATE MODIFICATION USING SPIROCYCLIC AMMONIUM SALTS AS CATALYST

CROSS-REFERENCE TO RELATED APPLICATIONS

This application is a national stage application (under 35 U.S.C. §371) of PCT/EP2015/053087, filed Feb. 13, 2015, which claims benefit of European Application No. 14155525.0, filed Feb. 18, 2014, both of which are incorporated herein by reference in their entirety.

FIELD OF THE INVENTION

The invention relates to a process for modifying isocyanates, in which at least one monomeric organic isocyanate having an NCO functionality of >1 is oligomerized in the presence of at least one catalyst, and to the use of such a catalyst.

BACKGROUND OF THE INVENTION

The oligo- or polymerization of isocyanates, especially to form high molecular weight oligomer mixtures having uretdione ("dimer"), isocyanurate ("trimer") and/or iminooxadiazinedione structures ("asymmetric trimer") in the molecular skeleton, collectively called isocyanate modification here, has long been known. The modified polyisocyanates comprising free NCO groups, which optionally may also have been temporarily deactivated with blocking agents, are exceptionally high-quality starting materials for the preparation of a multiplicity of polyurethane plastics and coating compositions.

A series of industrial methods for isocyanate modification have been established in which the isocyanate to be modified, usually a diisocyanate, is generally reacted by addition of catalysts and these are then rendered inactive (deactivated) by suitable measures, when the desired degree of conversion of the isocyanate to be modified has been reached, and the polyisocyanate obtained is generally separated from unreacted monomer. A summary of these methods from the prior art can be found in H. J. Laas et al., *J Prakt. Chem.* 1994, 336, 185 ff.

Useful modification catalysts have been found to be neutral bases and compounds of ionic composition. The latter can usually be used in a very small amount and lead extremely rapidly to the desired result. In the case of the neutral bases, depending on the monomer to be converted and the neutral base used, this is not always true, but it is virtually impossible to infer structure-effect or -activity relationships (cf. *Chem. Eur. J.* 2009, 15, 5200-5202).

The option of using tetraorganylammonium or -phosphonium as cation to the anion which is catalytically active toward isocyanates, such as hydroxide, alkanoate, alkoxylate, etc., is common knowledge, although generally not explicitly emphasized as being particularly preferred; cf. H. J. Laas et al., *J Prakt. Chem.* 1994, 336, 185 ff.

Additionally known is the use of fluorides and hydrogenpolyfluorides, the latter being stable adducts of HF with compounds containing fluoride ions, optionally also in the form of their ammonium or phosphonium salts, for the isocyanate modification, from documents including EP 962 455 A1, EP 962 454 A1, EP 896 009 A1, EP 798 299 A1, EP 447 074 A1, EP 379 914 A1, EP 339 396 A1, EP 315 692 A1, EP 295 926 A1 and EP 235 388 A1.

However, the tetraorganylammonium and -phosphonium (hydrogenpoly)fluorides of the prior art, in the performance of the modification reaction, often have the disadvantage that, when they are used, the reaction can sometimes be maintained only with continuous metered addition of catalyst, meaning that the breakdown of the catalyst in the isocyanate medium proceeds unacceptably quickly for technical purposes compared to the modification reaction.

An additional factor is that, when tetraorganylammonium (hydrogen)polyfluorides are used, an atypical reaction profile is sometimes observed, which leads to products having a much lower iminooxadiazinedione group content than in the case of a regular heat production rate profile (cf. EP 962 455 A1). According to the teaching of EP 962 455 A1, this disadvantage was eliminated by the use of phosphonium salts, but the latter—especially at relatively high reaction temperatures—have the unacceptably high tendency to decomposition mentioned further up, and the decomposition products can have an adverse effect on process and product stability.

EP 2 415 795 A1 describes very stable tetraorganylphosphonium (hydrogenpoly)fluorides that do not have these disadvantages, but they are not commercially available and are preparable only with difficulty.

DETAILED DESCRIPTION OF THE INVENTION

It was an object of the invention to provide an improved process for isocyanate modification, in which compounds that have good commercial availability or are easily preparable from inexpensive reactants are used as catalysts, these having a high catalytic activity and selectivity with simultaneously good catalyst stability.

This object is achieved by a process for modifying isocyanates, in which at least one monomeric organic isocyanate having an NCO functionality of >1 is oligomerized in the presence of at least one catalyst, wherein the process is characterized in that the catalyst comprises at least one spirocyclic ammonium salt having a cation of the formula I as catalysts for the isocyanate modification

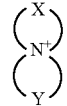

(Formula I)

where the nitrogen substituents X and Y are identical or different, substituted or unsubstituted $C_2$-$C_{20}$-alkylene chains optionally interrupted by heteroatoms (O, N, S) and aromatic rings.

Compounds of this structure type are obtainable in a simple manner by methods known from the literature (e.g. US 2007/0049750 and literature cited therein), for example by the action of secondary cyclic amines with suitably substituted dihaloalkanes, optionally in the presence of a hydrogen halide scavenger, and subsequent anion exchange.

According to the invention, X and Y in formula I may each independently be optionally substituted alkylene groups, preference being given to $C_4$-$C_6$-alkylene chains, especially in both N-centered rings. The C4-C6-alkylene chains are preferably of linear structure. These are obtainable in a simple manner, for example, by reaction of optionally C-substituted pyrrolidines, piperidines and azepanes (1H-hexahydroazepines) with 1,4-dihalobutane, 1,5-dihalopentane or 1,6-dihalohexane and the C-substituted derivatives thereof, where halogen is Cl, Br and I, preferably Cl.

In addition, for example, by analogous reaction of optionally C-substituted oxazolidines, isoxazolidines, oxazinanes, morpholines and oxazepanes and the analogs of the aforementioned N—O heterocycles which contain S rather than O, and also imidazolidines, pyrazolidines, piperazines and structurally related compounds, with the abovementioned dihaloalkanes, it is also possible to obtain representatives having C chains interrupted by heteroatoms in one of the X or Y segments of the general formula I. In the case of species containing 2 or more nitrogen atoms, it is additionally possible, by appropriate variation of the reaction conditions, also to produce salts having a doubly or multiply charged cation or, by prior suitable substitution of the nitrogen atom(s), to arrive at singly positively charged cations of the formula I in which one or more exocyclic alkyl substituent(s) is/are present on the trivalent nitrogen atom(s) of the X or Y ring. Of course, it is also possible through suitable choice of the alkylating agent to introduce a structural variation into the ring segment X or Y; examples include reactions of bis(2-haloethyl) ethers with the abovementioned secondary cyclic amines.

Examples of such syntheses are described, for example, in US 2007/0049750 A1, the content of which is hereby considered to be fully incorporated into the present application, especially with regard to paragraphs [0015] to [0039] of this publication.

Anions used in the compounds of the formula I may in principle be any species, especially those which are known to be catalytically active with respect to isocyanates, for example hydroxide, alkanoate, carboxylate, heterocycles having at least one negatively charged nitrogen atom in the ring, such as azolate, imidazolate, triazolate, tetrazolate, fluoride, hydrogendifluoride and higher polyfluorides (adducts of more than one equivalent of HF onto compounds containing fluoride ions), the fluorides, hydrogendifluorides and higher polyfluorides leading in accordance with the invention to products having a high iminooxadiazinedione group content.

The catalysts of the invention can be used individually or in any desired mixtures with one another.

By the modification process of the invention, a variety of high-quality polyisocyanates, which are therefore very valuable for the polyurethane sector, is obtainable in a simple manner. Depending on the starting (di)isocyanate used and the reaction conditions, the process of the invention affords polyisocyanates of the isocyanate trimer type (i.e. containing isocyanurate and/or iminooxadiazinedione structures) having a low proportion of uretdione groups ("isocyanate dimers"). In the case of rising reaction temperature, the proportion of the latter in the process products generally rises, but this effect is far less marked than when phosphonium salts with the identical anion are used.

In the process of the invention, it may further be the case that the oligomerization is conducted in the presence of a solvent and/or additive.

For performance of the process of the invention, it is possible in principle to use any known monomeric mono-, di- or polyisocyanates from the prior art, individually or in any desired mixtures with one another. Examples include: hexamethylene diisocyanate (HDI), 2-methylpentane-1,5-diisocyanate, 2,4,4-trimethyl-1,6-hexanediisocyanate, 2,2,4-trimethyl-1,6-hexanediisocyanate, 4-isocyanatomethyl-1,8-octanediisocyanate, 3(4)-isocyanatomethyl-1-methylcyclohexyl isocyanate (IMCI), isophorone diisocyanate (IPDI), 1,3- and 1,4-bis(isocyanatomethyl)-benzene (XDI), 1,3- and 1,4-bis(isocyanatomethyl)-cyclohexane (H6XDI), 2,4- and 2,6-toluylene diisocyanate (TDI), bis(4-isocyanatophenyl)methane (4,4'MDI), 4-isocyanatophenyl-2-isocyanatophenylmethane (2,4'MDI) and polycyclic products which are accessible by formaldehyde-aniline polycondensation and subsequent conversion of the resulting (poly)amines to the corresponding (poly)isocyanates (polymer-MDI).

Preference is given to monomeric aliphatic diisocyanates, i.e. diisocyanates in which both NCO groups are bonded to an $sp^3$-hybridized carbon atom. Particular preference is given to hexamethylene diisocyanate (HDI), 2-methylpentane 1,5-diisocyanate, 2,4,4-trimethylhexane 1,6-diisocyanate, 2,2,4-trimethylhexane 1,6-diisocyanate, 4-isocyanatomethyloctane 1,8-diisocyanate, 3(4)-isocyanatomethyl-1-methylcyclohexyl isocyanate (IMCI), isophorone diisocyanate (IPDI), 1,3- and 1,4-bis(isocyanatomethyl)benzene (XDI) and 1,3- and 1,4-bis(isocyanato-methyl)cyclohexane (H6XDI).

For the present invention, it is possible to use all the aforementioned isocyanates, irrespective of the method by which they have been prepared, i.e. whether they have been produced, for example, with or without use of phosgene.

The amount of the catalyst to be used in the process of the invention is guided primarily by the isocyanate used and the desired reaction rate and is preferably 0.001 to 5 mol %, based on the sum total of the molar amounts of the monomeric isocyanate used and the catalyst. Preference is further given to using 0.002 to 2 mol % of catalyst.

In the process of the invention, the catalyst may be used undiluted or dissolved in solvents. Useful solvents are all compounds which do not react with the catalyst and are capable of dissolving it to a sufficient degree, for example aliphatic or aromatic hydrocarbons, alcohols, ketones, esters and ethers. Preference is given to using alcohols.

The process of the invention can be effected within the temperature range from 0° C. to +250° C., preferably 20 to 180° C., more preferably 40 to 150° C., and can be interrupted at any degree of conversion, preferably after 5% to 80%, more preferably 10% to 60%, of the monomeric isocyanate used has been converted.

Catalyst deactivation can be accomplished in principle by employing a whole series of previously described prior art methods, for example the addition of (sub- or super-) stoichiometric amounts of strong acids or acid derivatives (e.g. benzoyl chloride, acidic esters of phosphorus- or sulfur-containing acids, these acids themselves, etc., but not HF), adsorptive binding of the catalyst and subsequent removal by filtration, and other methods known to those skilled in the art.

By contrast with catalysis by ammonium salts in which the charge-bearing nitrogen atom is not part of a spirocyclic ring system, when the catalysts of the invention having fluoride or oligo-/polyfluoride anions are used, there is surprisingly no observation of any anomalies at all in the heat production rate, and a homogeneous reaction profile is always observed, which leads to high-quality products having an iminooxadiazinedione group content optimal for the particular reaction conditions.

It is quite generally the case that the catalysts of the invention, irrespective of the anion which is responsible for the catalytic activity and selectivity, are much more stable in the isocyanate medium than the prior art derivatives known from the literature.

In a particular continuously operated embodiment of the process of the invention, the oligomerization can be undertaken in a tubular reactor.

The products or product mixtures obtained by the process of the invention are consequently versatile starting materials for production of optionally foamed plastic(s) and of paints, coating compositions, adhesives and additives. They are particularly suitable for the preparation of, as appropriate, water-dispersible one and two component polyurethane coatings, optionally in NCO-blocked form, by reason of their reduced solution and melt viscosity in comparison to (predominantly) isocyanurate-polyisocyanate based products at otherwise identically high or improved property profile. Thus, the HDI-based process products of the invention, even in high dilution in paint solvents, are more stable to the occurrence of flocculation or turbidity than corresponding prior art products.

The process products of the invention can be used pure or in conjunction with other prior art isocyanate derivatives, such as polyisocyanates containing uretdione, biuret, allophanate, isocyanurate and/or urethane groups, wherein the free NCO groups have optionally been deactivated with blocking agents.

The present invention further provides for the use of a spirocyclic ammonium salt having a cation of the formula I

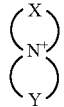

(Formula I)

where the nitrogen substituents X and Y are identical or different, substituted or unsubstituted C2-C20-alkylene chains optionally interrupted by heteroatoms (O, N, S) and aromatic rings, as catalysts for the oligomerization of monomeric organic isocyanates having an NCO functionality>1.

The present invention is elucidated in detail hereinafter by examples and comparative examples, but without restricting it thereto.

EXAMPLES

All percentages, unless noted otherwise, are understood to mean percent by weight.

Mol % figures were determined by NMR spectroscopy and always relate, unless specified otherwise, to the sum total of the NCO conversion products. The measurements were effected on the Bruker DPX 400 or DRX 700 instruments on about 5% ($^1$H NMR) or about 50% ($^{13}$C NMR) samples in dry $C_6D_6$ at a frequency of 400 or 700 MHz ($^1$H NMR) or 100 or 176 MHz ($^{13}$C NMR). The reference employed for the ppm scale was small amounts of tetramethylsilane in the solvent with $^1$H NMR chemical shift 0 ppm. Alternatively, the $C_6D_5H$ present in the solvent was used as reference signal: $^1$H NMR chemical shift 7.15 ppm, $^{13}$C NMR chemical shift 128.02 ppm. Data for the chemical shift of the compounds in question were taken from the literature (cf. D. Wendisch, H. Reiff and D. Dieterich, Die Angewandte Makromolekulare Chemie 141, 1986, 173-183 and literature cited therein and EP-A 896 009.

The dynamic viscosities were determined at 23° C. using the Haake VT 550 viscometer. By measurements at different shear rates, it was ensured that the flow behavior of the polyisocyanate mixtures described according to the invention and also of the comparative products corresponds to ideal Newtonian fluids. The shear rate data can therefore be omitted.

The determination of the residual monomer contents was conducted by gas chromatography.

All reactions were carried out under a nitrogen atmosphere unless otherwise stated.

The diisocyanates used are products of Bayer MaterialScience AG, D-51368 Leverkusen and all other commercially available chemicals were sourced from Aldrich, D-82018 Taufkirchen.

The catalysts that are not commercially available were obtained by methods known from the literature, as described in US 2007/0049750 and the literature cited therein.

Example 1

Catalyst Preparation

5-Azoniaspiro[4.5]decane Salts 85.2 g (1 mol) of piperidine, 127.0 g (1 mol) of 1,4-dichlorobutane and 138.21 g (1 mol) of potassium carbonate were initially charged in 700 mL of 2-propanol and the mixture was heated at reflux for 12 h. The reaction mixture obtained was cooled and then filtered, the filter residue was washed three times with about 100 mL of warm 2-propanol and the combined filtrates were concentrated to about 650 g. To about 100 g of this solution in each case (chloride content determined by argentometry: 5.3%) were added dropwise, at room temperature, a) about 50 g of a saturated potassium hydroxide solution in methanol, b) about 250 g of a saturated potassium fluoride solution in methanol, c) about 70 g of a saturated potassium acetate solution in methanol or d) about 120 g of an about 20% potassium pivalate solution in methanol, and the mixture was stirred for 24 hours and filtered. The filter residue was washed three times with about 50 mL of 2-propanol, and each wash was followed by concentration under reduced pressure at room temperature to about ⅓ of the starting volume, in order to substantially remove methanol and precipitate residues of inorganic salts. This was followed by another filtration and washing with about 10 mL of 2-propanol in each case and concentration as before. The combined filtrates were finally concentrated under reduced pressure to about 80 g (b) or about 160 g (a, c and d) and analyzed.

a) OH⁻ content (by titration against 0.1 N HCl, phenolphthalein indicator): 1.5% b) F⁻ content (ion-sensitive electrode): 3.7% c) $CH_3C(O)O^-$ content (by titration against 0.1 N HCl, bromophenol blue indicator): 5.4% d) $(CH_3)_3CC(O)O^-$ content (by titration against 0.1 N HCl, bromophenol blue indicator): 9.3%

Catalyst solution 1b was subsequently admixed with 3 g of anhydrous HF for conversion to the difluoride (catalyst solution 1 e). Further catalysts were obtained by an analogous method from the respective secondary cyclic amine and the corresponding alpha,omega-dichloroalkane. Subsequently, the optimal catalyst concentration for the HDI trimerization was determined in explanatory preliminary experiments at 60° C. (cf. ex. 2) and the concentration of the catalyst solution was adjusted by diluting with 2-propanol such that only slight gel particle formation, if any, was observed when the catalyst solution was added to the HDI.

An overview of this can be found in table 1.

TABLE 1

| Example | Cation | Anion | Solvent | Concentration [%] |
|---|---|---|---|---|
| 1a | piperidinium | OH⁻ | 2-PrOH | 1 |
| 1c | piperidinium | $CH_3C(O)O^-$ | 2-PrOH | 5 |
| 1d | piperidinium | $(CH_3)_3CC(O)O^-$ | 2-PrOH | 10 |
| 1e | piperidinium | $[HF_2]^-$ | 2-PrOH | 30 |
| 2 | pyrrolidinium | $[HF_2]^-$ | 2-PrOH | 30 |
| 3 | azepanium | $[HF_2]^-$ | 2-PrOH | 30 |
| 4 | morpholinium | $[HF_2]^-$ | 2-PrOH | 5 |
| 5 | piperidinium | $[HF_2]^-$ | 2-PrOH | 25 |
| 6 | azepanium | $[HF_2]^-$ | 2-PrOH | 20 |

Example 2

A jacketed flange vessel heated to the starting temperature desired in each case by means of an external circuit, having a stirrer, reflux condenser connected to an inert gas system (nitrogen/vacuum) and thermometer, was initially charged with 1000 g of HDI which was freed of dissolved gases by stirring under reduced pressure (<1 mbar) for one hour. After venting with nitrogen, the amount of catalyst specified in table 2 was metered in in such a way that the maximum temperature specified in table 2 was not exceeded. After about 1 mol of NCO groups had been converted, as indicated by attainment of a refractive index (measured at 20° C.; $n_D^{20}$) between 1.4600 and 1.4620, the catalyst was deactivated by addition of an amount of the stopper solution specified in table 2 that was equivalent to the catalyst, and the mixture was stirred at reaction temperature for a further 30 min and subsequently worked up.

The time between the first addition of catalyst and addition of the stopper solution was used to calculate the turnover frequency (TOF) reported in table 2, defined as the quotient of the molar amount of the NCO groups A converted in the oligomerization and the product of the molar amount of catalyst B needed for the purpose and the reaction time t (measured in seconds) by the following equation:

$$TOF = A*(B*t)^{-1} \ [mol*(mol*sec)^{-1}].$$

In some cases, multiple experiments were conducted at the same reaction temperature, in which case the catalyst was metered in more slowly and in some cases also in portions in the first experiment in each case, in order to ascertain the optimal amount for the subsequent experiment. In the latter, the catalyst was metered in more rapidly, or the target conversion was already attained after addition of less catalyst and/or after a shorter time, which leads to higher TOF values.

The workup was effected by vacuum distillation in a thin film evaporator of the short-path evaporator (SPE) type with an upstream preliminary evaporator (PE) (distillation data: pressure: 0.08+/−0.04 mbar, PE temperature: 120° C., ME temp.: 140° C.), with separation of unconverted monomer as distillate and the low-monomer polyisocyanate resin as bottom product (starting run). The polyisocyanate resin was separated and the distillate collected in a second stirring apparatus with flat-ground joints, identical in construction to the first, and made up to the starting amount (1000 g) with freshly degassed HDI. This was then treated again with catalyst and processed as described above. This procedure was repeated several times with variation of the reaction temperature (experiments A, B, C, . . . ). The results can be found in table 2.

Finally, the distillate composition was ascertained by gas chromatography. In no case could decomposition products of the catalyst cation be detected (detection limit of about 2 ppm).

TABLE 2

| Example no. | | Catalyst soln. [g] | Reaction temperature from-to [° C.] | | Stopper | TOF |
|---|---|---|---|---|---|---|
| 2a- | A | 1a, [8.2] | 60 | 69 | 1 | 1.1 |
| 2a- | B | 1a, [6.2] | 60 | 63 | 1 | 2.5 |
| 2a- | C | 1a, [7.0] | 80 | 82 | 1 | 1.5 |
| 2a- | D | 1a, [7.2] | 80 | 81 | 1 | 2.4 |
| 2a- | E | 1a, [6.4] | 100 | 102 | 1 | 1.6 |
| 2a- | F | 1a, [6.1] | 100 | 101 | 1 | 2.8 |
| 2b- | A | 1e, [0.25] | 60 | 60 | 3 | 0.3 |
| 2b- | B | 1e, [0.19] | 60 | 60 | 3 | 0.5 |
| 2b- | C | 1e, [0.22] | 80 | 81 | 3 | 0.8 |
| 2b- | D | 1e, [0.24] | 80 | 82 | 3 | 1.1 |
| 2b- | E | 1e, [0.24] | 100 | 104 | 3 | 1.8 |
| 2b- | F | 1e, [0.25] | 100 | 100 | 3 | 2.1 |
| 2b- | G | 1e, [0.27] | 120 | 130 | 3 | 3.7 |
| 2b- | H | 1e, [0.28] | 120 | 121 | 3 | 4.2 |
| 2b- | I | 1e, [0.40] | 140 | 154 | 3 | 2.4 |
| 2b- | J | 1e, [0.33] | 140 | 154 | 3 | 3.2 |
| 2c- | A | 1c, [2.2] | 60 | 63 | 1 | 0.3 |
| 2c- | B | 1c, [2.0] | 60 | 61 | 1 | 0.3 |
| 2c- | C | 1c, [1.6] | 80 | 82 | 1 | 0.4 |
| 2c- | D | 1c, [1.4] | 80 | 81 | 1 | 0.7 |
| 2c- | E | 1c, [1.5] | 100 | 103 | 1 | 3.5 |
| 2c- | F | 1c, [1.6] | 100 | 103 | 1 | 3.9 |
| 2d- | A | 1d, [1.9] | 60 | 63 | 1 | 0.3 |
| 2d- | B | 1d, [1.7] | 60 | 62 | 1 | 0.6 |
| 2d- | C | 1d, [1.2] | 80 | 82 | 1 | 0.8 |
| 2d- | D | 1d, [1.1] | 80 | 81 | 1 | 0.9 |
| 2d- | E | 1d, [1.0] | 100 | 101 | 1 | 2.5 |
| 2d- | F | 1d, [0.9] | 100 | 102 | 1 | 3.3 |
| 2e- | A | 2, [0.41] | 60 | 64 | 2 | 0.9 |
| 2e- | B | 2, [0.39] | 60 | 62 | 2 | 1.2 |
| 2e- | C | 2, [0.34] | 80 | 85 | 2 | 1.4 |

TABLE 2-continued

| Example no. | Catalyst soln. [g] | Reaction temperature from-to [° C.] | | Stopper | TOF |
|---|---|---|---|---|---|
| 2e- | D 2, [0.32] | 80 | 81 | 2 | 1.8 |
| 2e- | E 2, [0.28] | 100 | 103 | 2 | 2.1 |
| 2e- | F 2, [0.26] | 100 | 102 | 2 | 2.9 |
| 2f- | A 3, [0.48] | 60 | 64 | 2 | 1.0 |
| 2f- | B 3, [0.46] | 60 | 64 | 2 | 1.2 |
| 2f- | C 3, [0.42] | 80 | 81 | 2 | 1.4 |
| 2f- | D 3, [0.42] | 80 | 82 | 2 | 1.8 |
| 2f- | E 3, [0.40] | 100 | 102 | 2 | 2.1 |
| 2f- | F 3, [0.39] | 100 | 102 | 2 | 2.5 |
| 2g- | A 4, [2.1] | 60 | 65 | 2 | 1.3 |
| 2g- | B 4, [2.0] | 60 | 63 | 2 | 2.9 |
| 2g- | C 4, [1.72] | 80 | 88 | 2 | 2.9 |
| 2g- | D 4, [1.68] | 80 | 85 | 2 | 3.8 |
| 2g- | E 4, [1.52] | 100 | 110 | 2 | 3.9 |
| 2g- | F 4, [1.49] | 100 | 105 | 2 | 4.2 |
| 2h- | A 5, [0.57] | 60 | 64 | 3 | 1.1 |
| 2h- | B 5, [0.56] | 60 | 64 | 3 | 1.3 |
| 2h- | C 5, [0.45] | 80 | 81 | 3 | 1.8 |
| 2h- | D 5, [0.42] | 80 | 82 | 3 | 2.0 |
| 2h- | E 5, [0.42] | 100 | 102 | 3 | 2.2 |
| 2h- | F 5, [0.37] | 100 | 102 | 3 | 2.5 |
| 2i- | A 6, [0.82] | 60 | 61 | 3 | 1.0 |
| 2i- | B 6, [0.80] | 60 | 62 | 3 | 1.0 |
| 2i- | C 6, [0.78] | 80 | 80 | 3 | 1.5 |
| 2i- | D 6, [0.77] | 80 | 81 | 3 | 1.6 |
| 2i- | E 6, [0.75] | 100 | 102 | 3 | 1.8 |
| 2i- | F 6, [0.54] | 100 | 101 | 3 | 2.0 |

Table 2: Stopper solutions:
1: dibutyl phosphate,
2: toluenesulfonic acid, 40% in 2-PrOH,
3: dodecylbenzenesulfonic acid, 70% in 2-PrOH The resins obtained were, without exception, light-colored clear viscous liquids with no perceptible amine odor. In the case of use of the fluorine-containing catalysts, the result was mixtures of isocyanurate and iminooxadiazinedione along with a little uretdione. The proportion of iminooxadiazinedione groups is at a maximum at a reaction temperature around 60° C. and decreases when the reaction temperature is increased. In that case, there is increased formation of isocyanurate and uretdione, but the proportion of the latter increases much less significantly in the case of catalysis with the corresponding quaternary phosphonium salts according to EP 962 455 A1.

The oxygen-containing anions afford products of the isocyanurate type, with complete conversion of the alcohol used as catalyst solvent (2-propanol here) to the allophanate (especially relevant in the case of the hydroxides used in higher dilution because of their high reactivity, ex. 2a-A to -F).

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

The invention claimed is:

1. A process for modifying isocyanates comprising:
oligomerizing at least one monomeric organic isocyanate having an NCO functionality >1 in the presence of at least one catalyst comprising at least one spirocyclic ammonium salt having a cation of the formula I

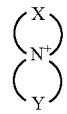

(Formula I)

wherein the nitrogen substituents X and Y are independently identical or different, substituted or unsubstituted C2-C20-alkylene chains, optionally interrupted by heteroatoms (O, N, S) and aromatic rings.

2. The process according to claim 1, wherein X and/or Y are each independently optionally substituted C4-C6-alkylene chains.

3. The process according to claim 1, wherein an anion of the at least one spirocyclic ammonium salt is selected from the group consisting of hydroxide, alkanoate, carboxylate, heterocycles having at least one negatively charged nitrogen atom in the ring.

4. The process according to claim 1, wherein the oligomerization is conducted in the presence of a solvent and/or an additive.

5. The process according to claim 1, wherein the monomeric organic isocyanate is selected from aliphatic diisocyanates.

6. The process according to claim 1 wherein the catalyst of the formula I is used in an amount of 0.001 to 5 mol %, based on the sum total of the molar amounts of the monomeric organic isocyanate used and the catalyst.

7. The process according to claim 1, wherein the process is conducted within the temperature range from 0° C. to +250° C.

8. The process according to claim 1, wherein the oligomerization is stopped after 5% to 80% by weight of the monomeric organic isocyanate has been converted.

9. The process according to claim 8, wherein the oligomerization is stopped by deactivating the catalyst.

10. The process according to claim 8, wherein unconverted monomeric organic isocyanate is separated from the reaction mixture.

11. The process according to claim 2, wherein the C4-C6-alkylene chains are linear in structure.

12. The process according to claim 3, wherein the anion is selected from the group consisting of azolate, imidazolate, triazolate or tetrazolate, fluoride, hydrogendifluoride and mixtures of these.

13. The process according to claim 5, wherein the monomeric organic isocyanate is selected from the group consisting of hexamethylene diisocyanate (HDI), 2-methylpentane 1,5-diisocyanate, 2,4,4-trimethylhexane 1,6-diisocyanate, 2,2,4-trimethylhexane 1,6-diisocyanate, 4-isocyanatomethyloctane 1,8-diisocyanate, 3(4)-isocyanatomethyl-1-methylcyclohexyl isocyanate (IMCI), isophorone diisocyanate (IPDI), 1,3- and 1,4-bis(isocyanatomethyl)benzene (XDI), 1,3- and 1,4-bis(isocyanato-methyl)cyclohexane (H6XDI) and mixtures of these.

14. The process according to claim 6, wherein the catalyst of the formula I is used in an amount of 0.002 to 2 mol% of catalyst.

15. The process according to claim 7, wherein the process is conducted within the temperature range from 20 to 180° C.

16. The process according to claim 7, wherein the process is conducted within the temperature range from 40 to 150° C.

17. The process according to claim 8, wherein the process is stopped after 10% to 60% by weight of the monomeric organic isocyanate has been converted.

18. The process according to claim 9, wherein the step of deactivating the catalyst comprises adding an acid or an acid derivative, adsorptively binding the catalyst and then removing the catalyst by filtration.

* * * * *